US008909005B2

(12) United States Patent
Satoh et al.

(10) Patent No.: US 8,909,005 B2
(45) Date of Patent: Dec. 9, 2014

(54) PHOTOELECTRIC CONVERSION MODULE HAVING PATTERN FOR RESTRICTING A POSITION OF AN OPTICAL FIBER

(75) Inventors: Masataka Satoh, Hitachi (JP); Kouki Hirano, Hitachinaka (JP); Hiroki Yasuda, Mito (JP); Hiroshi Ishikawa, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 127 days.

(21) Appl. No.: 13/614,194

(22) Filed: Sep. 13, 2012

(65) Prior Publication Data
US 2013/0064499 A1 Mar. 14, 2013

(30) Foreign Application Priority Data

Sep. 13, 2011 (JP) ................................. 2011-199200
Aug. 24, 2012 (JP) ................................. 2012-185341

(51) Int. Cl.
*G02B 6/12* (2006.01)
*G02B 6/36* (2006.01)
*G02B 6/42* (2006.01)

(52) U.S. Cl.
CPC .............. *G02B 6/4214* (2013.01); *G02B 6/423* (2013.01); *G02B 6/428* (2013.01); *G02B 6/4267* (2013.01); *G02B 6/3652* (2013.01); *G02B 6/3692* (2013.01)
USPC .......................................................... 385/14

(58) Field of Classification Search
CPC .......................................................... G02B 6/00
USPC .......................................................... 385/14
See application file for complete search history.

(56) References Cited

U.S. PATENT DOCUMENTS

| 5,764,832 | A  | * | 6/1998  | Tabuchi ........................... 385/49 |
| 6,115,515 | A  | * | 9/2000  | Itoh et al. ........................ 385/14 |
| 7,174,062 | B2 | * | 2/2007  | Fukuyama et al. ............. 385/14 |
| 7,220,065 | B2 | * | 5/2007  | Han et al. ........................ 385/89 |
| 7,242,823 | B2 |   | 7/2007  | Karashima et al. |
| 7,242,828 | B2 | * | 7/2007  | Oda et al. ........................ 385/31 |
| 7,876,984 | B2 | * | 1/2011  | Matsuoka ........................ 385/14 |
| 2005/0196095 | A1 |   | 9/2005  | Karashima et al. |
| 2005/0281513 | A1 | * | 12/2005 | Choi et al. ........................ 385/89 |
| 2007/0224735 | A1 |   | 9/2007  | Karashima et al. |
| 2013/0022316 | A1 | * | 1/2013  | Pelletier et al. .................. 385/37 |
| 2013/0142484 | A1 | * | 6/2013  | Wu et al. ........................ 385/49 |
| 2014/0064663 | A1 | * | 3/2014  | Hung .............................. 385/49 |

FOREIGN PATENT DOCUMENTS

| JP | 2002-82244   | A | 3/2002 |
| JP | 2003-14946   | A | 1/2003 |
| JP | 2005-234557  | A | 9/2005 |
| JP | A-2008-129385 |   | 6/2008 |
| JP | 2010-113331  | A | 5/2010 |

OTHER PUBLICATIONS

Japanese Official Action dated Mar. 26, 2013 received from the Japanese Patent Office in related JP Patent Application 2012-185341.

* cited by examiner

*Primary Examiner* — Akm Enayet Ullah
(74) *Attorney, Agent, or Firm* — Scully, Scott, Murphy & Presser, PC

(57) ABSTRACT

A photoelectric conversion module includes a substrate, a photoelectric conversion element optically coupled to an optical fiber, and a conductor pattern that is provided on a surface of the substrate and includes an electrode pattern mounting the photoelectric conversion element and a restriction pattern for restricting a position of the optical fiber.

16 Claims, 15 Drawing Sheets

PHOTOELECTRIC CONVERSION MODULE HAVING PATTERN FOR RESTRICTING A POSITION OF AN OPTICAL FIBER

The present application is based on Japanese patent application Nos. 2011-199200 and 2012-185341 filed on Sep. 13, 2011 and Aug. 24, 2012, respectively, the entire contents of which are incorporated herein by reference.

BACKGROUND OF THE INVENTION

1. Field of the Invention

The invention relates to a photoelectric conversion module.

2. Description of the Related Art

Conventionally, a photoelectric conversion module for converting an electric signal into an optical signal or an optical signal into an electric signal, is used for a connector portion of a communication cable with an optical fiber.

For example, a photoelectric conversion module disclosed in JP-A-2008-129385 has an optical fiber mounting portion with a groove for arranging an optical fiber therein on a circuit board with a wiring pattern. An optical fiber, an optical waveguide and an optical semiconductor element are mounted on the wiring board and the optical fiber is optically connected to the optical semiconductor element via the optical waveguide.

SUMMARY OF THE INVENTION

It is desirable to reduce the manufacturing cost of the photoelectric conversion module. Since the photoelectric conversion module disclosed in JP-A-2008-129385 requires a manufacturing step for forming a groove on the optical fiber mounting portion, a problem that the manufacturing cost increases by the manufacturing step for the groove will arise.

Accordingly, it is an object of the invention to provide a photoelectric conversion module that can decrease the number of manufacturing steps to reduce the manufacturing cost.

(1) According to one embodiment of the invention, a photoelectric conversion module comprises:

a substrate;

a photoelectric conversion element optically coupled to an optical fiber; and a conductor pattern that is provided on a surface of the substrate and includes an electrode pattern mounting the photoelectric conversion element and a restriction pattern for restricting a position of the optical fiber.

In the above embodiment (1) of the invention, the following modifications and changes can be made.

(i) The electrode pattern has the same thickness as the restriction pattern and comprises the same material as the restriction pattern.

(ii) A mirror portion comprising a reflective surface is formed on the conductor pattern to optically couple the photoelectric conversion element to the optical fiber.

(iii) A height of the mirror portion from the surface of the substrate is equal to the thickness of the electrode pattern and the thickness of the restriction pattern and comprises the same material as the electrode pattern and the restriction pattern.

(iv) The mirror portion comprises a contact surface on the substrate side of the reflective surface to restrict a position of the optical fiber in an axial direction by abutting against a tip of the optical fiber.

(v) The mirror portion is formed to extend along the substrate in a direction orthogonal to the optical axis of the optical fiber such that both end portions in the extending direction are integrally connected to the electrode pattern and restriction pattern.

(vi) $T1>(D+d)/2$ is satisfied where D is a diameter of the optical fiber, d is a core diameter of the optical fiber and $T1$ is a thickness of the conductor pattern.

(vii) The photoelectric conversion element is mounted on the electrode pattern via bumps, and $T1+T2>D$ is satisfied where $T2$ is a height of the bump.

(viii) A tip of the optical fiber is arranged between the substrate and the photoelectric conversion element and is fixed to the substrate.

(ix) The restriction pattern comprises two protruding strips spaced apart from each other with the optical fiber interposed therebetween.

(x) A cut-out portion is formed at least one of the two protruding strips on the tip side of the optical fiber such that a distance between facing surfaces of the protruding strips is increased by the cut-out portion.

(xi) A recessed portion is formed on the two protruding strips except end portions so as to be separated from the optical fiber.

(xii) The restriction pattern comprises a plurality of pairs of protrusion sandwiching the optical fiber.

(xiii) The optical fiber is fixed to the substrate by a hold-down member fixed to the restriction pattern via an adhesive layer.

(xiv) The conductor pattern comprises a Cu layer, a Ni layer provided on a surface of the Cu layer and an Au layer provided on a surface of the Ni layer.

(xv) The Ni layer has a thickness of not less than 9 μm and not more than 15 μm.

Points of the Invention

According to one embodiment of the invention, a photoelectric conversion module is constructed such that a conductor pattern on the surface of a substrate is composed of an electrode pattern mounting a photoelectric conversion element and a restriction pattern for restricting the position of an optical fiber. Thus, it is possible to together form the electrode pattern and the restriction pattern in a single manufacturing step, i.e., the formation of the conductor pattern. Therefore, the photoelectric conversion module can decrease the number of the manufacturing steps to reduce the manufacturing cost.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment

Figure 1:
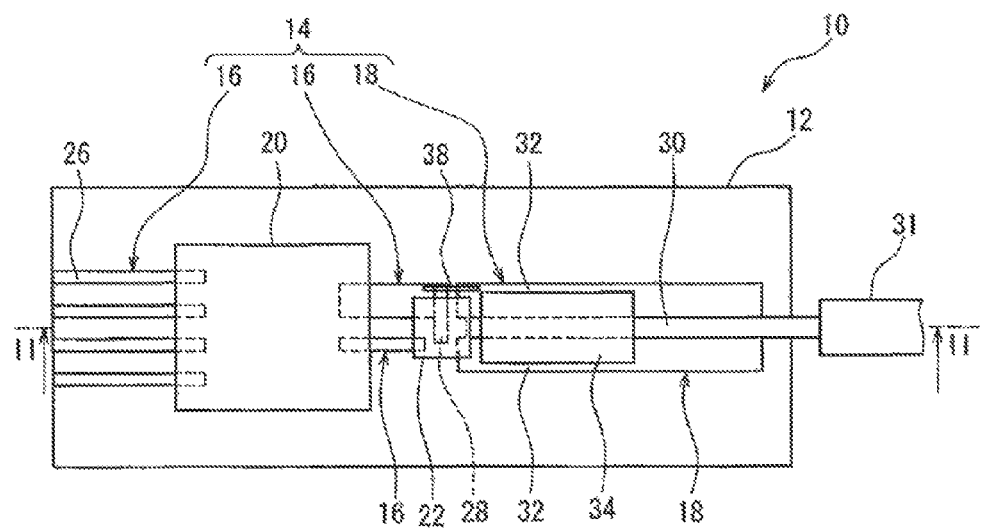
FIG. 1 is a schematic plan view showing a photoelectric conversion module in a first embodiment.
Figure 2:
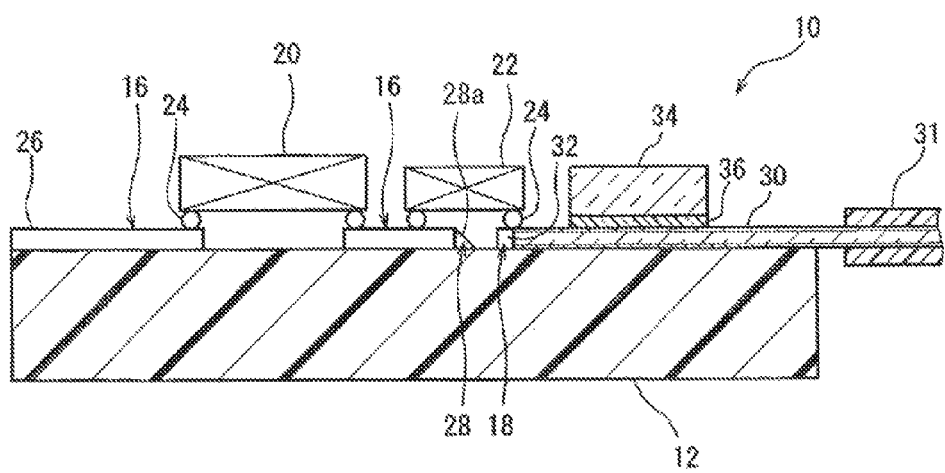
FIG. 2 is a schematic cross sectional view along line II-II in FIG. 1.

A first embodiment of the invention will be described below in reference to the drawings. FIG. 1 is a schematic plan view showing a photoelectric conversion module 10 in the first embodiment and FIG. 2 is a schematic cross sectional view along line II-II in FIG. 1.

A photoelectric conversion module 10 is provided with a substrate 12, a photoelectric conversion element 22 optically coupled to an optical fiber 30 and a conductor pattern 14 provided on a surface of the substrate 12. The conductor pattern 14 is composed of an electrode pattern 16 mounting the photoelectric conversion element 22 and a restriction pattern 18 for restricting a position of the optical fiber 30. A mirror portion 28 having a reflecting surface 28a is formed on the conductor pattern 14 to optically couple the photoelectric conversion element 22 to the optical fiber 30. An IC (integrated circuit) chip 20 is mounted on the electrode pattern 16 so as to be electrically connected to the photoelectric conversion element 22.

The substrate 12 is formed of, e.g., a glass epoxy resin or a polyimide resin.

The conductor pattern 14 is a conductor layer patterned on the surface of the substrate 12. In the first embodiment, the conductor pattern 14 is composed of a Cu (copper) layer laminated and patterned on the surface of the substrate 12, a Ni (nickel) layer provided by plating a surface of the Cu layer and an Au (gold) layer provided by plating a surface of the Ni layer. The conductor pattern 14 is formed by a manufacturing method comprising a manufacturing step of laminating the Cu layer on the surface of the substrate 12, a manufacturing step of patterning the laminated Cu layer by etching, a manufacturing step of plating the Ni layer on the surface of the patterned Cu layer and a manufacturing step of plating the Au layer on the surface of the Ni layer. The conductor pattern 14 includes the electrode pattern 16 and the restriction pattern 18 which are formed together in the same manufacturing step at the time of forming the conductor pattern 14.

The IC chip 20 and the photoelectric conversion element 22 are mounted on the surface of the substrate 12 at predetermined positions. Each of the IC chip 20 and the photoelectric conversion element 22 is flip-chip mounted and is electrically connected to the electrode pattern 16 via plural bumps 24 formed of gold. In the first embodiment, some of the plural bumps 24 of the photoelectric conversion element 22 are connected to the restriction pattern 18.

The photoelectric conversion element 22 is a light-emitting element such as LD (laser diode) or a light-receiving element such as PD (photodiode). When the photoelectric conversion element 22 is a light-emitting element, the IC chip 20 is a driving circuit for the light-emitting element, and when the photoelectric conversion element 22 is a light-receiving element, the IC chip 20 is an amplifier circuit for amplifying output of the light-receiving element.

The photoelectric conversion element 22 is a surface light-emitting type or a surface light-receiving type, and is arranged so that a light exit surface or a light incident surface thereof faces the surface of the substrate 12. In the first embodiment, the photoelectric conversion element 22 is VCSEL (Vertical Cavity Surface Emitting Laser).

The electrode pattern 16 includes electrode terminals 26 located at an edge of the substrate 12, and the IC chip 20 is electrically connected to an external electric circuit via the electrode terminals 26. In addition, the IC chip 20 is electrically connected to the photoelectric conversion element 22 via the electrode pattern 16.

In the first embodiment, the mirror portion 28 is provided integrally with the electrode pattern 16 on the surface of the substrate 12. An optical path extending from the photoelectric conversion element 22 toward the surface of the substrate 12 is bent 90 degrees by reflection at the reflecting surface 28a of the mirror portion 28 so as to travel along the surface of the substrate 12.

On the surface of the substrate 12, the optical fiber 30 is arranged so that the end portion thereof is along the surface. The end portion of the optical fiber 30 is arranged on an optical path extending from the mirror portion 28, and accordingly, the photoelectric conversion element 22 and the optical fiber 30 are optically coupled via the mirror portion 28. A covering 31 at the end portion of the optical fiber 30 is removed by end processing.

The position of the end portion of the optical fiber 30 on the surface of the substrate 12 is restricted by the restriction pattern 18. The restriction pattern 18 is composed of two protruding strips 32, 32 which extend in parallel at a predetermined distance (a distance substantially the same as a diameter of the optical fiber 30). The end portion of the optical fiber 30 is arranged between and positioned by the protruding strips 32, 32 in a direction parallel to the surface of the substrate 12 as well as perpendicular to an optical axis of the optical fiber 30. On the protruding strips 32, 32, a fiber hold-down member 34 is fixed via an adhesive layer 36 so as to cover the end portion of the optical fiber 30. The end portion of the optical fiber 30 is fixed by the fiber hold-down member 34.

The fiber hold-down member 34 is formed of, e.g., a glass plate or resin and has optical transparency. The adhesive layer 36 is formed of, e.g., an ultraviolet curable resin which is cured by irradiation of ultraviolet rays through the fiber hold-down member 34. An adhesive used for the adhesive layer 36 is not limited to the ultraviolet curable resin, but preferably has optical transparency considering the case of entering between the mirror portion 28 and the end portion of the optical fiber 30.

It should be noted that, in the first embodiment, the protruding strip 32 also serves as a portion of the electrode pattern 16, and the protruding strip 32 serving as the electrode pattern 16 is connected to another portion of the electrode pattern 16 by, e.g., a wire 38. For electrical connection between the electrode pattern 16 and the restriction pattern 18, conductive ink or metal nano-paste may be applied and baked instead of using the wire 38.

Figure 3:
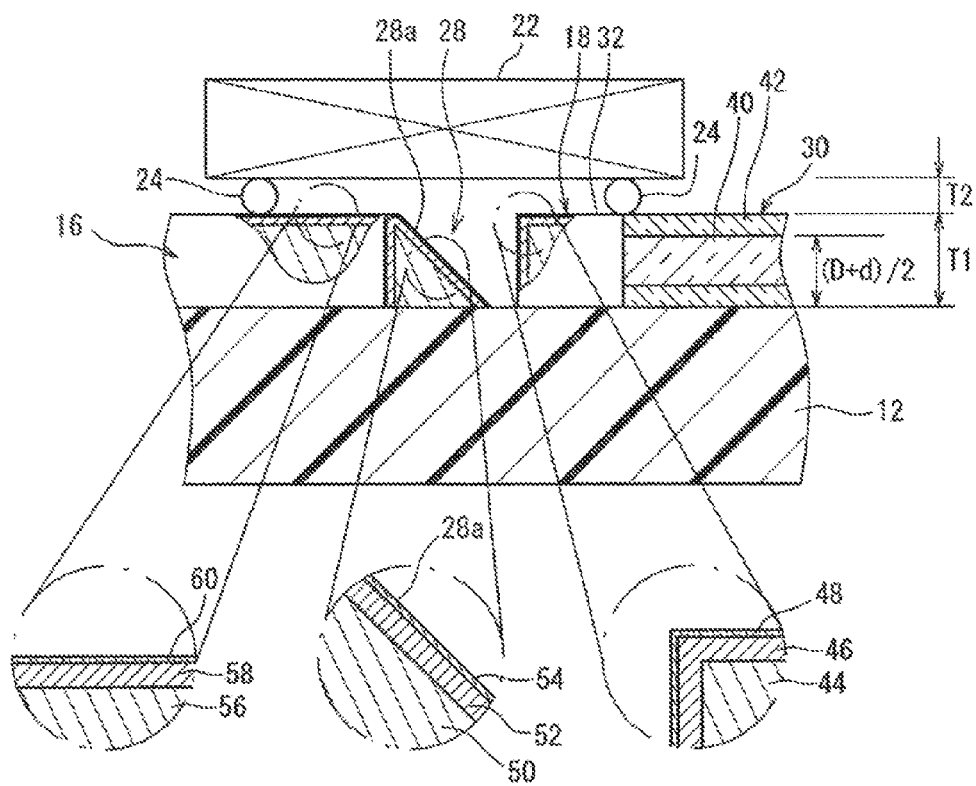
FIG. 3 is a schematic enlarged cross sectional view showing the vicinity of a photoelectric conversion element of FIG. 2.

FIG. 3 is an enlarged view showing the vicinity of the photoelectric conversion element 22 of FIG. 2. The optical fiber 30 is composed of a columnar core 40 and a clad 42 covering an outer peripheral surface of the core 40. The optical fiber 30 may be either a multi-mode fiber or a single-mode fiber, and may be formed of glass or resin.

It is preferable to satisfy a relation represented by the following formula:

$$T1>(D+d)/2$$

where D is a diameter of the optical fiber 30, d is a diameter of the core 40 and T1 is a thickness of the protruding strip 32 of the restriction pattern 18 (i.e., a thickness of the conductor pattern 14). The thickness T1 of the protruding strip 32 is equal to a height of the mirror portion 28, and the height of the mirror portion 28 from the surface of the substrate 12 exceeds the height of the core 40 of the optical fiber 30 by satisfying the relation. This enhances coupling efficiency of the optical fiber 30 to the photoelectric conversion element 22.

The thickness T1 of the protruding strip 32 is preferably not more than the diameter D of the optical fiber 30 (T1<D). As a result, when the fiber hold-down member 34 is fixed, the optical fiber 30 is firmly fixed between the substrate 12 and the fiber hold-down member 34.

Meanwhile, it is preferable to satisfy a relation represented by the following formula:

$$T1+T2>D$$

where T2 is a height of the bump 24. In other words, it is preferable that a distance from the surface of the substrate 12 to the photoelectric conversion element 22 be greater than the diameter D of the optical fiber 30. By satisfying this relation, it is possible to arrange the end portion of the optical fiber 30 in a gap between the substrate 12 and the photoelectric conversion element 22 and the tip of the end portion of the optical fiber 30 can be arranged closer to the mirror portion 28. As a result, coupling efficiency of the photoelectric conversion element 22 to the optical fiber 30 is enhanced.

A schematic partial cross section of the protruding strip 32 of the restriction pattern 18 is shown in a lower right circle of FIG. 3. The protruding strip 32 is composed of a Cu layer 44 provided on the surface of the substrate 12, a Ni layer 46 provided on a surface of the Cu layer 44 and an Au layer 48 provided on a surface of the Ni layer 46.

When the diameter D of the optical fiber 30 is 80 µm, it is preferable that the Cu layer 44 have a thickness of not less than 50 µm and not more than 80 µm, the Ni layer 46 have a thickness of not less than 9 µm and not more than 15 µm and the Au layer 48 have a thickness of not less than 0.05 µm and not more than 0.5 µm.

Meanwhile, when the diameter D of the optical fiber 30 is 125 µm, it is preferable that the Cu layer 44 have a thickness of not less than 80 µm and not more than 125 µm, the Ni layer 46 have a thickness of not less than 9 µm and not more than 15 µm and the Au layer 48 have a thickness of not less than 0.05 µm and not more than 0.5 µm.

A schematic partial cross section of the mirror portion 28 is shown in a lower middle circle of FIG. 3. The mirror portion 28 includes a Cu layer 50 which is provided on the surface of the substrate 12 and has an inclined surface which is inclined at 45 degrees with respect to the surface. A Ni layer 52 and an Au layer 54 are provided on the inclined surface.

A schematic partial cross section of the electrode pattern 16 is shown in a lower left circle of FIG. 3. The electrode pattern 16 is composed of a Cu layer 56 provided on the surface of the substrate 12, a Ni layer 58 provided on a surface of the Cu layer 56 and an Au layer 60 provided on a surface of the Ni layer 58.

As described above, the Cu layers, the Ni layers and the Au layers of the restriction pattern 18, the mirror portion 28 and the electrode pattern 16 are formed together respectively in the same manufacturing steps. The thickness of the restriction pattern 18, the thickness of the electrode pattern 16 and the height of the mirror portion 28 are equal. The restriction pattern 18, the electrode pattern 16 and the mirror portion 28 are formed of the same materials such as the Cu layer, the Ni layer and the Au layer, and thicknesses thereof are respectively the same.

Method of Manufacturing Conductor Pattern and Mirror Portion

A method of manufacturing the conductor pattern 14 and the mirror portion 28 will be described below.

The Cu layer is laminated on the surface of the substrate 12.

Figure 4:
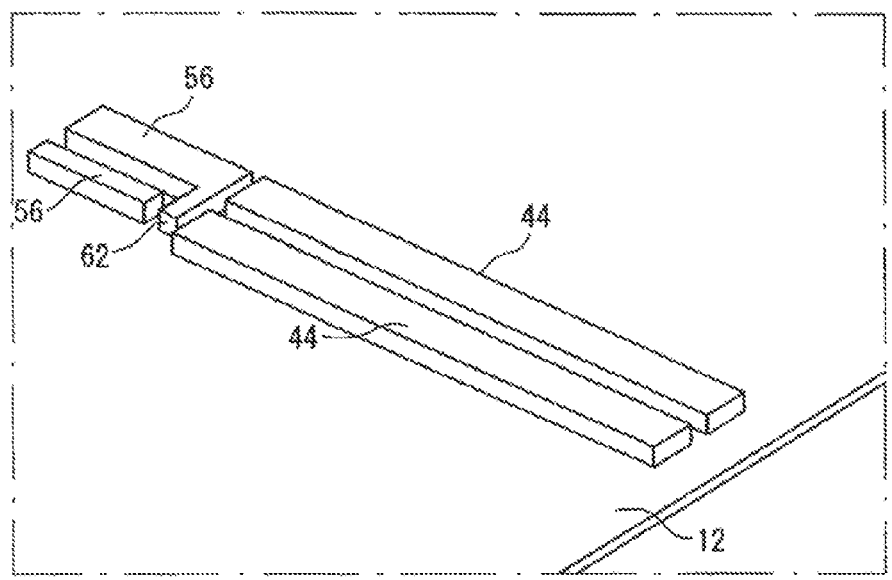
FIG. 4 is an explanatory diagram illustrating a manufacturing method of a conductor pattern and a mirror portion and is a schematic perspective view showing a state immediately after etching a Cu layer.

Following this, the Cu layer laminated on the surface of the substrate 12 is patterned by etching. FIG. 4 shows a pattern of the etched Cu layer. The pattern formed by etching includes the Cu layer 44 of the restriction pattern 18, the Cu layer 56 of the electrode pattern 16 and a rod portion 62 which is later shaped into the Cu layer 50 of the mirror portion 28. The rod portion 62 is provided integrally with the Cu layer 56 of the electrode pattern 16.

Figure 5:
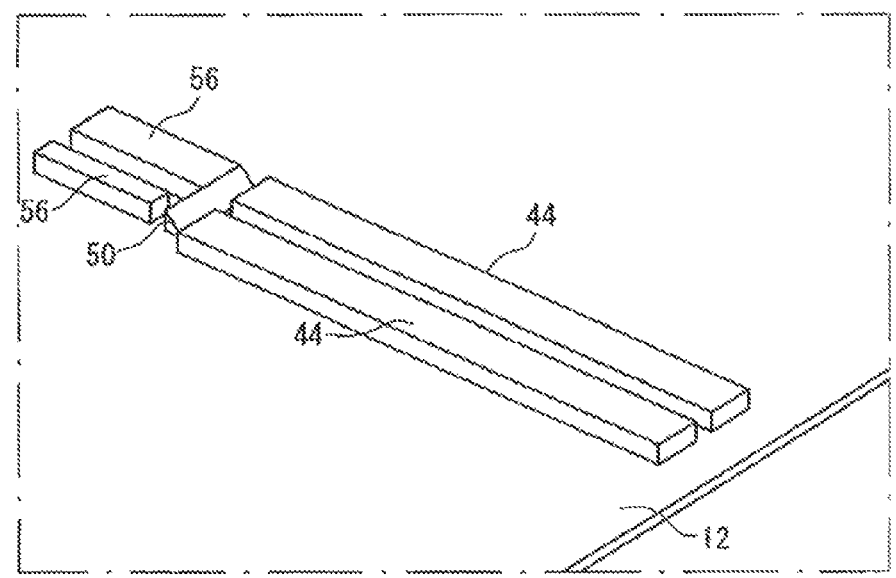
FIG. 5 is an explanatory diagram illustrating the manufacturing method of the conductor pattern and the mirror portion and is a schematic perspective view showing a state immediately after forming a Cu layer of the mirror portion.

Next, the rod portion 62 is cut by V-cut dicing, thereby forming the Cu layer 50 with an inclined surface of the mirror portion 28 as shown in FIG. 5. After this, the Ni layers and the Au layers of the restriction pattern 18, the mirror portion 28 and the electrode pattern 16 are simultaneously formed by electrolytic plating and non-electrolytic plating. As a result, the restriction pattern 18, the mirror portion 28 and the electrode pattern 16 are formed on the surface of the substrate 12. The surface of the Au layer 54 of the mirror portion 28 is the reflecting surface 28a.

Figure 6:
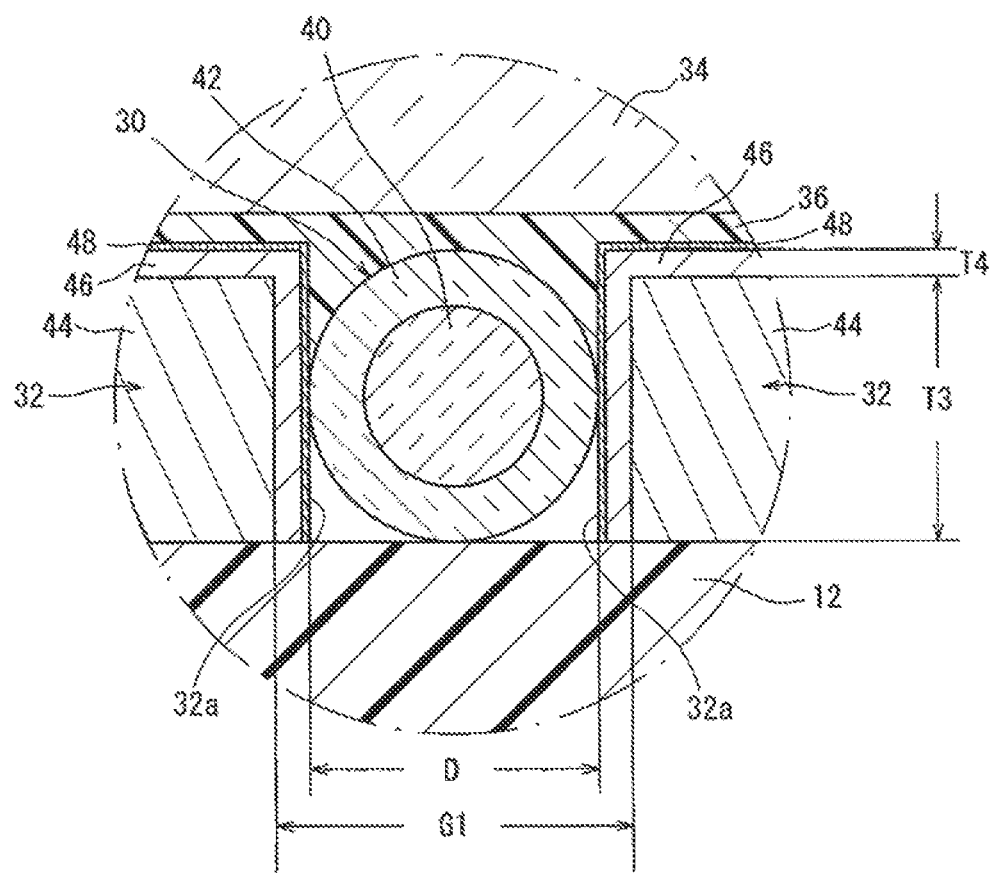
FIG. 6 is a schematic enlarged cross sectional view showing the vicinity of an end portion of an optical fiber.

FIG. 6 is a schematic partial cross sectional view including the end portion of the optical fiber 30. When, for example, the diameter D of the optical fiber 30 is set to 80 µm and the thickness T1 of the protruding strip 32 of the restriction pattern 18 is set to 80 µm, a thickness T3 of the Cu layer 44 of the protruding strip 32, i.e., a thickness of the Cu layer to be laminated on the substrate 12 is about 70 µm.

And in this case, a gap G1 between the Cu layers 44 of the protruding strips 32 which are formed by etching is set to about 100 µm, a thickness T4 of the Ni layer 46 is set to 10 µm and the Au layer 48 is set to 0.05 µm. The thickness T1 of the protruding strip 32 is substantially equal to a total of the thickness T3 of the Cu layer 44 and the thickness T4 of the Ni layer 46.

In the photoelectric conversion module 10 of the first embodiment, the conductor pattern 14 composed of the electrode pattern 16 mounting the photoelectric conversion element 22 and the restriction pattern 18 for restricting the position of the optical fiber 30 is provided on the surface of the substrate 12. It is possible to form the electrode pattern 16 and the restriction pattern 18 together in the same manufacturing steps in the formation of the conductor pattern 14. Accordingly, the photoelectric conversion module 10 allows the number of the manufacturing steps to be cut down and the cost to be reduced.

In addition, in the photoelectric conversion module 10 of the first embodiment, the mirror portion 28 for optically coupling the photoelectric conversion element 22 to the optical fiber 30 is formed on the conductor pattern 14. Therefore, it is also possible to form the mirror portion 28 together with the electrode pattern 16 and the restriction pattern 18. It is possible to reduce components of the mirror member and thus to reduce the cost.

Meanwhile, the photoelectric conversion module 10 of the first embodiment is provided with the Ni layer having a thickness of not less than 9 μm and not more than 15 μm.

Conventionally, a thickness of the Ni layer which is provided by plating the surface of the Cu layer is about not less than 1 μm and not more than 3 μm. In photoelectric conversion module 10 of the first embodiment, when the diameter D of the optical fiber 30 is, e.g., 80 μm, it is necessary to form a thick Cu layer 44 of about 70 μm in order to form the restriction pattern 18 which restricts the optical fiber 30. On the other hand, in order to mount the photoelectric conversion element 22, a gap between the electrode patterns 16 and a gap between the electrode pattern 16 and the restriction pattern 18 need to be a narrow gap of about 50 μm. When the thickness of the Ni layer is about not less than 1 μm and not more than 3 μm, it is necessary to form a Cu layer of about 70 μm in thickness with a gap of about 50 μm. However, there is a problem that it is difficult to form a pattern with such a size only by etching the Cu layer.

Accordingly, in the photoelectric conversion module 10 of the first embodiment, a Cu layer having a thickness of about 70 μm is formed with a gap of about 70 μm to 80 μm which is wider than a conventional case, and a Ni layer of not less than 9 μm and not more than 15 μm which is thicker than a conventional Ni layer is formed on the surface of the Cu layer so that a final gap of the pattern is about 50 μm. This facilitates to form patterns of the electrode pattern 16 and the restriction pattern 18 having a thickness of about 70 μm with a gap of about 50 μm.

Figure 7:
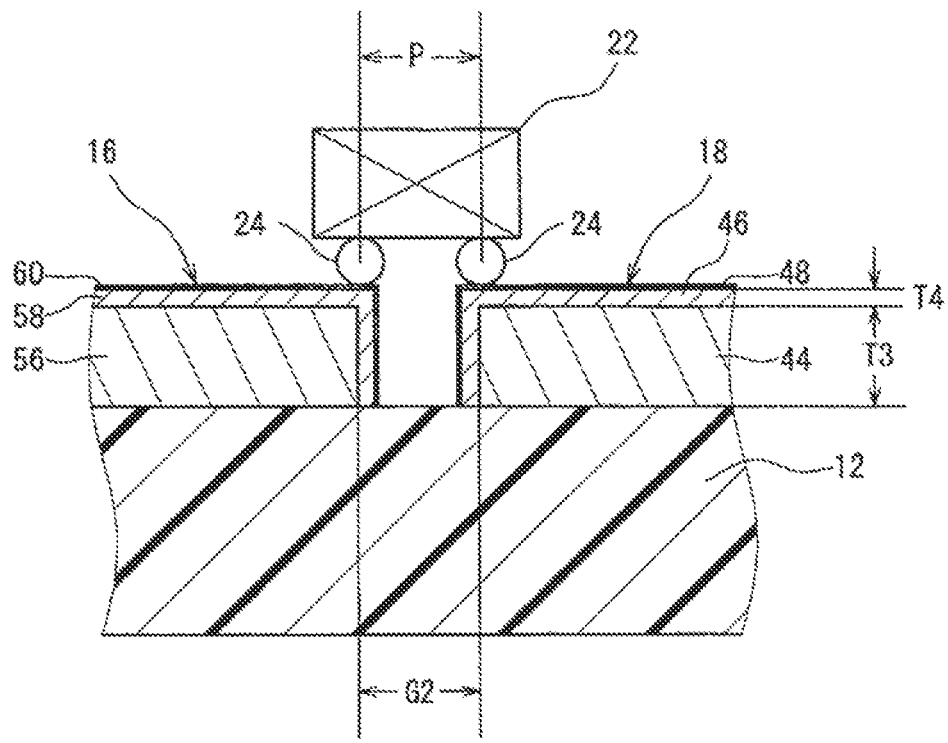
FIG. 7 is an explanatory diagram illustrating a shape of the conductor pattern in the case that a bump pitch is narrow.

For example, as shown in FIG. 7, when the thickness T3 of the Cu layer 44 is 70 μm and a pitch P between the bumps 24 of the photoelectric conversion element 22 is 50 μm, it is possible to form a gap of not more than 50 μm between the restriction pattern 18 and the electrode pattern 16 by forming a gap G2 of about 70 μm between the Cu layer 44 of the restriction pattern 18 and the Cu layer 56 of the electrode pattern 16 and then providing the Ni layers 46, 58 and the Au layer 48, 60.

Furthermore, although the inclined surface of the Cu layer 50 of the mirror portion 28 is formed by dicing and thus is a slightly rough surface, it is possible to improve smoothness of the reflecting surface 28a of the mirror portion 28 by providing the thicker Ni layer 52 than the conventional art on the inclined surface of the Cu layer. It is desired that the surface roughness Ra of the reflecting surface 28a be not more than one-fifth of wavelength of light propagating through the optical fiber 30. When the wavelength of the light propagating through the optical fiber 30 is, e.g., 850 nm, it is desired that the surface roughness Ra of the reflecting surface 28a be not more than 170 nm. The coupling efficiency between the photoelectric conversion element 22 and the optical fiber 30 is further enhanced by thus forming the reflecting surface 28a.

In addition, since the mirror portion 28 is integrally formed with the conductor pattern 14, separation of the mirror portion 28 is prevented. If the mirror portion 28 is further integrally formed with a ground electrode of the electrode pattern 16, an effect of blocking electromagnetic noise is obtained by the mirror portion 28.

Meanwhile, since the conductor pattern 14 is thicker than a wiring pattern formed on a typical printed board of an electronic device (e.g., 35 μm), heat of the photoelectric conversion element 22 or the IC chip 20 is diffused into the conductor pattern 14 by thermal conduction via the plural bumps 24 and it is thereby possible to dissipate the heat of the photoelectric conversion element 22 or the IC chip 20.

Although the end portion of the optical fiber 30 is fixed to the substrate 12 by fixing the fiber hold-down member 34 on the protruding strips 32, 32 via the adhesive layer 36 in the first embodiment, the optical fiber 30 may be fixed by a film-like solder resist (an insulation film) instead of using the fiber hold-down member 34 and the adhesive layer 36. Use of the solder resist for fixing the optical fiber 30 arranged between the protruding strips 32, 32 allows the number of components to be reduced.

Second Embodiment

A photoelectric conversion module 100 in a second embodiment will be described below. Note that, in the following description of the embodiment, the same or similar components as or to those described in the first embodiment are denoted by the same names and reference numerals, and the explanation thereof will be omitted or simplified.

Figure 8:
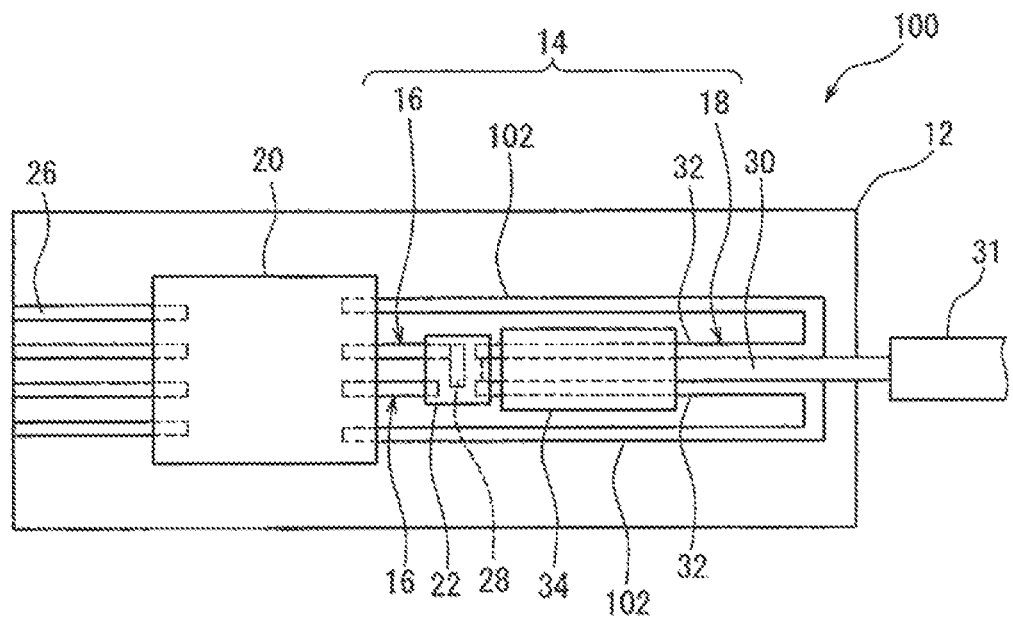
FIG. 8 is a schematic plan view showing a photoelectric conversion module in a second embodiment.

FIG. 8 is a schematic plan view showing the photoelectric conversion module 100. In the photoelectric conversion module 100, the IC chip 20 is connected to the restriction pattern 18 via a wiring 102. The wiring 102 is formed on the surface of the substrate 12 in the same manufacturing step as for the electrode pattern 16 and the restriction pattern 18, and constitutes a portion of the electrode pattern 16.

In detail, the wiring 102 extends from the IC chip 20 on the outside of the photoelectric conversion element 22 and the protruding strip 32 so as to be parallel to the end portion of the optical fiber 30, is bent at a right angle in the vicinity of the edge of the substrate 12, and is connected to the end portion of the protruding strip 32. Meanwhile, since the wire 38 is not used for the connection unlike the first embodiment, widths of the electrode pattern 16 and the protruding strip 32 are narrower than those in the first embodiment.

The photoelectric conversion module 100 in the second embodiment achieves the same effect as the photoelectric conversion module 10 in the first embodiment.

Third Embodiment

Figure 9:
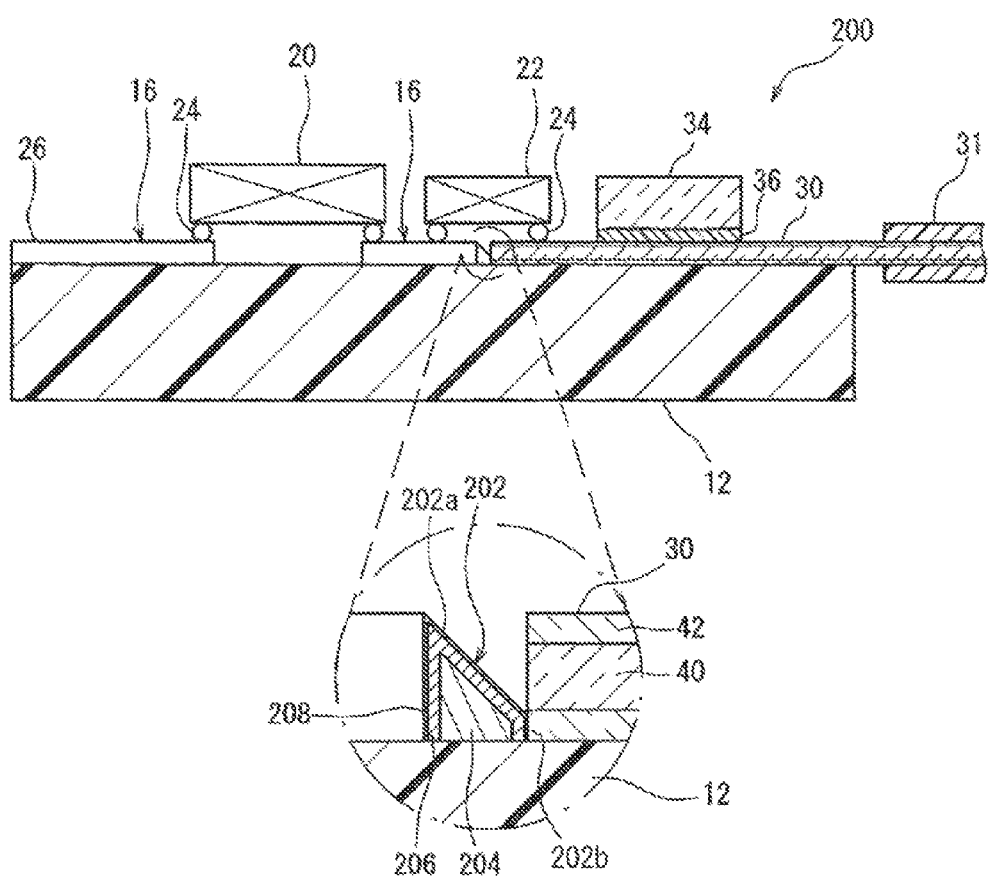
FIG. 9 is a schematic cross sectional view showing a photoelectric conversion module in a third embodiment.

A photoelectric conversion module 200 in a third embodiment will be described below. FIG. 9 is a schematic cross sectional view showing the photoelectric conversion module 200. The photoelectric conversion module 200 is different from the second embodiment in a shape of a mirror portion 202 having a reflecting surface 202a and a position of the tip of the optical fiber 30.

In detail, as shown in an enlarged view in a circle of FIG. 9, a Cu layer 204 of the mirror portion 202 has an inclined surface and a vertical surface which continues to a lower rim of the inclined surface and is perpendicular to the surface of the substrate 12. The Cu layer 204 is covered by a Ni layer 206 and an Au layer 208, and the mirror portion 202 has a contact surface 202b which is a vertical surface covered by the Ni layer 206 and the Au layer 208.

The contact surface 202b is perpendicular to the surface of the substrate 12, and the tip of the optical fiber 30 partially abuts against the contact surface 202b. The contact surface 202b restricts the position of the tip of the optical fiber 30 in an optical axis direction of the optical fiber 30. Note that, a height of the contact surface 202b is smaller than a thickness of the clad 42 of the optical fiber 30.

The photoelectric conversion module 200 in the third embodiment achieves the same effect as the photoelectric conversion modules 10 and 100 in the first and second embodiments.

In addition, in the photoelectric conversion module 200 of the third embodiment, the position of the tip of the optical fiber 30 is restricted by the contact surface 202b of the mirror portion 202, which facilitates to arrange and fix the end portion of the optical fiber 30 to the substrate 12.

In addition, since a distance between the mirror portion 202 and the tip of the optical fiber 30 is short in the photoelectric conversion module 200 of the third embodiment, coupling efficiency is further enhanced.

Fourth Embodiment

Figure 10:
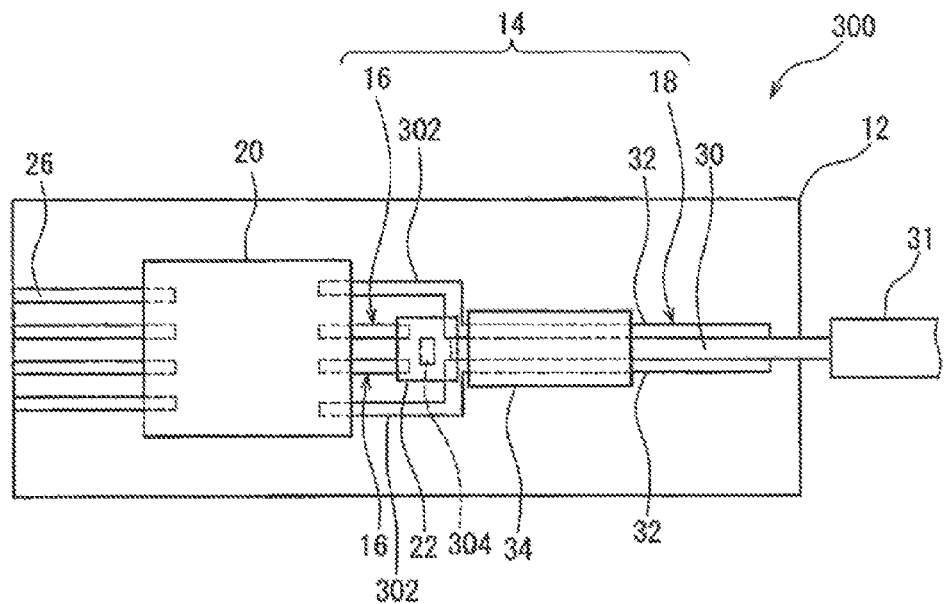
FIG. 10 is a schematic plan view showing a photoelectric conversion module in a fourth embodiment.

A photoelectric conversion module 300 in a fourth embodiment will be described below. FIG. 10 is a schematic plan view showing the photoelectric conversion module 300. The photoelectric conversion module 300 is different from the second embodiment in shapes of a wiring 302 and a mirror portion 304.

In detail, the wiring 302 is connected to end portions of the protruding strips 32, 32 on the photoelectric conversion element 22 side. That is, the shape of a wiring which connects the restriction pattern 18 to the IC chip 20 is not specifically limited.

On the other hand, the mirror portion 304 has the same structure as the mirror portion 28 except that there is a distance from the electrode pattern 16 and the restriction pattern 18 (no electrical connection).

The photoelectric conversion module 300 in the fourth embodiment achieves substantially the same effect as the photoelectric conversion module 100 in the second embodiment.

Fifth Embodiment

Figure 11:
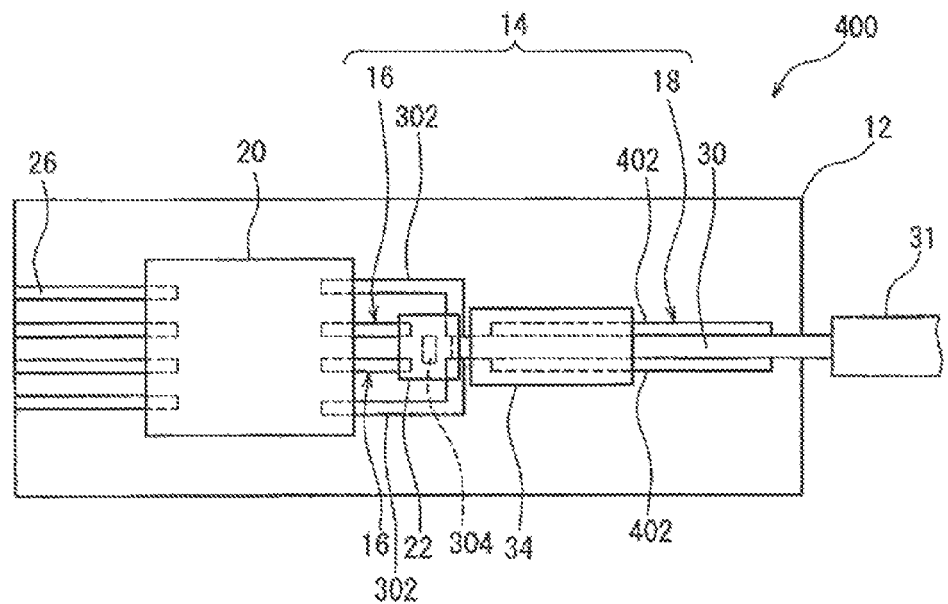
FIG. 11 is a schematic plan view showing a photoelectric conversion module in a fifth embodiment.

A photoelectric conversion module 400 in a fifth embodiment will be described below. FIG. 11 is a schematic plan view showing the photoelectric conversion module 400. The photoelectric conversion module 400 is different from the fourth embodiment in that the wiring 302 is separated from protruding strips 402 of the restriction pattern 18 (no electrical connection).

In detail, the wiring 302 constituting a portion of the electrode pattern 16 is connected to the photoelectric conversion element 22, and the protruding strips 402 are not connected to the photoelectric conversion element 22 and the IC chip 20. In other words, the restriction pattern 18 does not serve as the electrode pattern 16.

The photoelectric conversion module 400 in the fifth embodiment achieves the same effect as the photoelectric conversion module 300 in the fourth embodiment.

Sixth Embodiment

Figure 12:
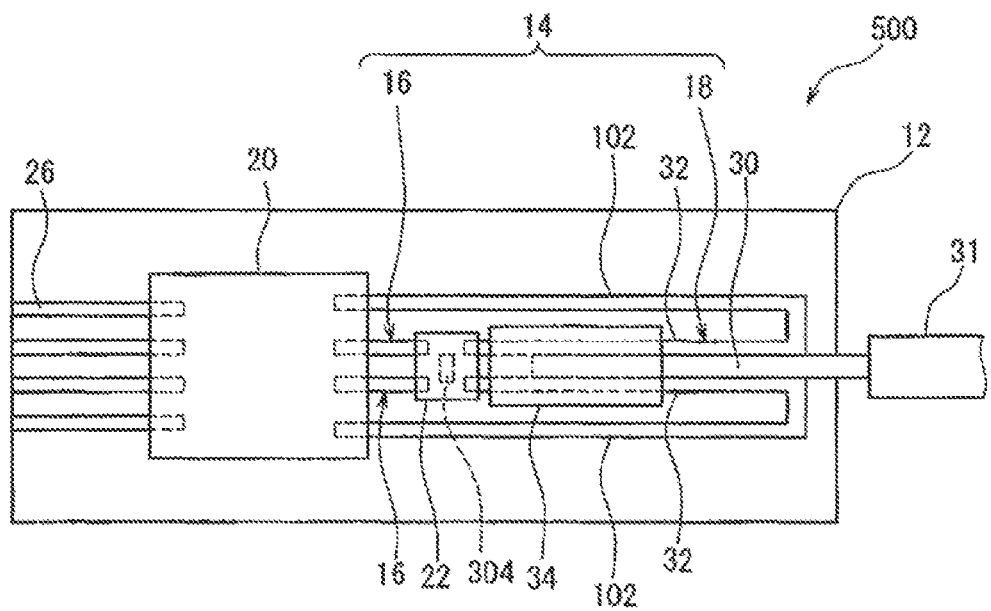
FIG. 12 is a schematic plan view showing a photoelectric conversion module in a sixth embodiment.

A photoelectric conversion module 500 in a sixth embodiment will be described below. FIG. 12 is a schematic plan view showing the photoelectric conversion module 500. The photoelectric conversion module 500 is different from the second embodiment in that the tip of the optical fiber 30 is not located between the photoelectric conversion element 22 and the surface of the substrate 12 and the mirror portion 304 is separated from the electrode pattern 16. In detail, the tip of the optical fiber 30 is located between the fiber hold-down member 34 and the surface of the substrate 12.

In the photoelectric conversion module 500 of the sixth embodiment, the optical fiber 30 is fixed to the substrate 12 in a state that the tip of the optical fiber 30 is not inserted between the photoelectric conversion element 22 and the substrate 12, which facilitates to arrange and fix the end portion of the optical fiber 30 to the substrate 12.

Seventh Embodiment

Figure 13:
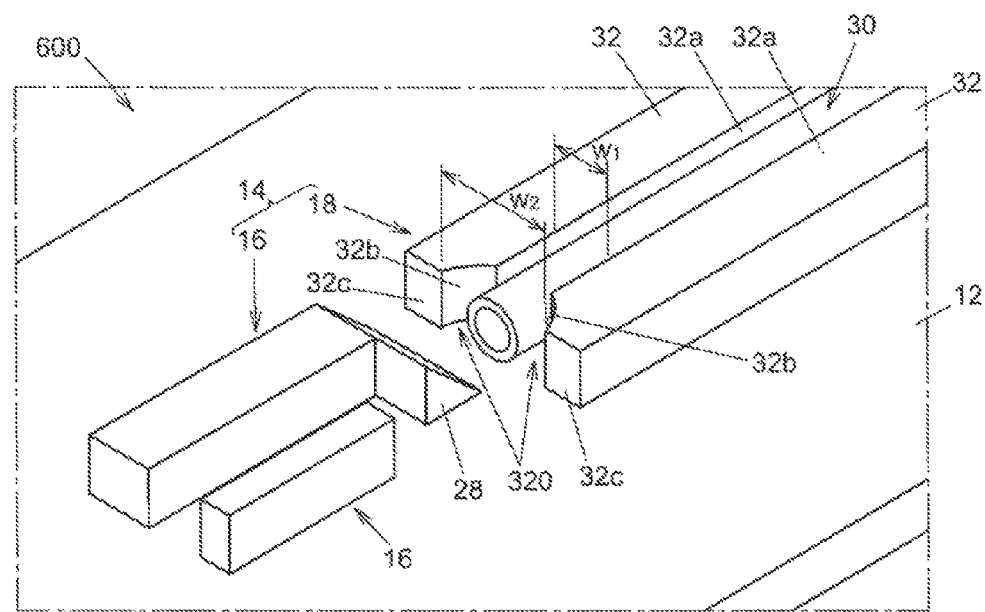
FIG. 13 is a schematic perspective view showing a photoelectric conversion module in a seventh embodiment.

A photoelectric conversion module 600 in a seventh embodiment will be described below. FIG. 13 is a schematic perspective view showing the photoelectric conversion module 600. It should be noted that illustrations of the photoelectric conversion element 22, the IC chip 20 and the fiber hold-down member 34, etc., are omitted in FIG. 13 to FIG. 19 for convenience of explanation.

The photoelectric conversion module 600 is different from the first embodiment in that a cut-out portion 320 is formed at end portions of the two protruding strips 32, 32 on the tip side of the optical fiber 30 such that a distance between facing surfaces of the protruding strips 32, 32 is increased by the cut-out portion 320.

In the example shown in FIG. 13, the cut-out portion 320 curved into a concave arc shape is formed on each end portion of the protruding strips 32, 32. When portions of the facing surfaces of the protruding strips 32, 32 in which the cut-out portion 320 is not formed are defined as first facing surfaces 32a, 32a and portions of the facing surfaces having the cut-out portions 320 formed thereon are defined as second facing surfaces 32b, 32b, a distance between the first facing surfaces 32a, 32a is constant and a distance between the second facing surfaces 32b, 32b gradually increases toward end faces 32c (end faces on the mirror portion 28 side) of the two protruding strips 32, 32. When the distance between the first facing surfaces 32a is defined as W1 and the distance between the second facing surfaces 32b at the end faces 32c is defined as W2, W2 is, e.g., twice or more of W1.

In the photoelectric conversion module 600 of the seventh embodiment, even if a side surface of a blade of a dicer contacts with an end face of the Cu layer 44 (shown in FIG. 4) of the protruding strip 32 at the time of forming the Cu layer 50 of the mirror portion 28 by dicing the rod portion 62 (shown in FIG. 4), interruption of the optical axis of the optical fiber 30 due to a burr generated by such contact is suppressed. In other words, even if a burr is generated, the burr is prevented from reaching the optical axis of the optical fiber 30 since W2 is larger than W1, and interception of communication conducted by an optical signal propagating through the optical fiber 30 can be avoided. In addition, when the optical fiber 30 is arranged so that the tip thereof protrudes from a gap between the protruding strips 32, 32 toward the mirror portion 28, a phenomenon in which it becomes impossible to arrange the optical fiber 30 between the protruding strips 32, 32 due to contact with the burr generated during dicing can be suppressed.

Alternatively, the cut-out portion 320 may be formed on only one of the two protruding strips 32, 32. In this case, considering a forward moving direction and a rotation direction of the blade, the cut-out portion 320 should be formed on the protruding strip 32 on which a burr is generated in a direction toward the optical axis of the optical fiber 30. In addition, the shape of the cut-out portion 320 is not limited to a concave arc shape which is exemplary illustrated in FIG. 13, and may be, e.g., a flat tapered shape inclined with respect to the end face 32c of the protruding strip 32 or a convex arc shape. Alternatively, the cut-out portion 320 may be notched in a rectangular shape.

Eighth Embodiment

Figure 14:
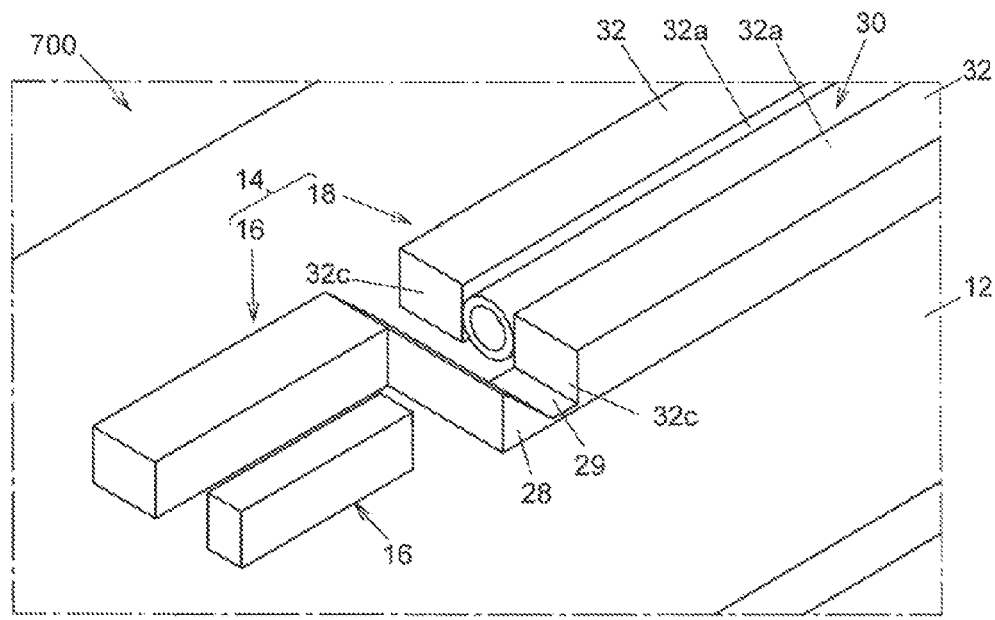
FIG. 14 is a schematic perspective view showing a photoelectric conversion module in an eighth embodiment.

A photoelectric conversion module 700 in an eighth embodiment will be described below. FIG. 14 is a schematic perspective view showing the photoelectric conversion module 700. The photoelectric conversion module 700 is different from the first embodiment in that the mirror portion 28 is formed to extend along the substrate 12 in a direction orthogonal to the optical axis of the optical fiber 30 such that one end portion in the extending direction is connected to the electrode pattern 16 and another end is integrally connected to the protruding strip 32 (the restriction pattern 18).

In the example shown in FIG. 14, the mirror portion 28 is formed in a triangular prism shape having a thickness increasing from the protruding strip 32 side toward the electrode pattern 16 side, and is integrally connected to the electrode pattern 16 at an end portion on the left side in the FIG. 14. An end portion of the mirror portion 28 on the right side in FIG. 14 is integrally connected to the protruding strip 32 (one of the two protruding strips 32, 32 which is located on the right side in the drawing) via a coupling portion 29. The coupling portion 29 has a plate shape having a uniform thickness which is smaller than thicknesses of the electrode pattern 16 and the restriction pattern 18.

Figure 15:
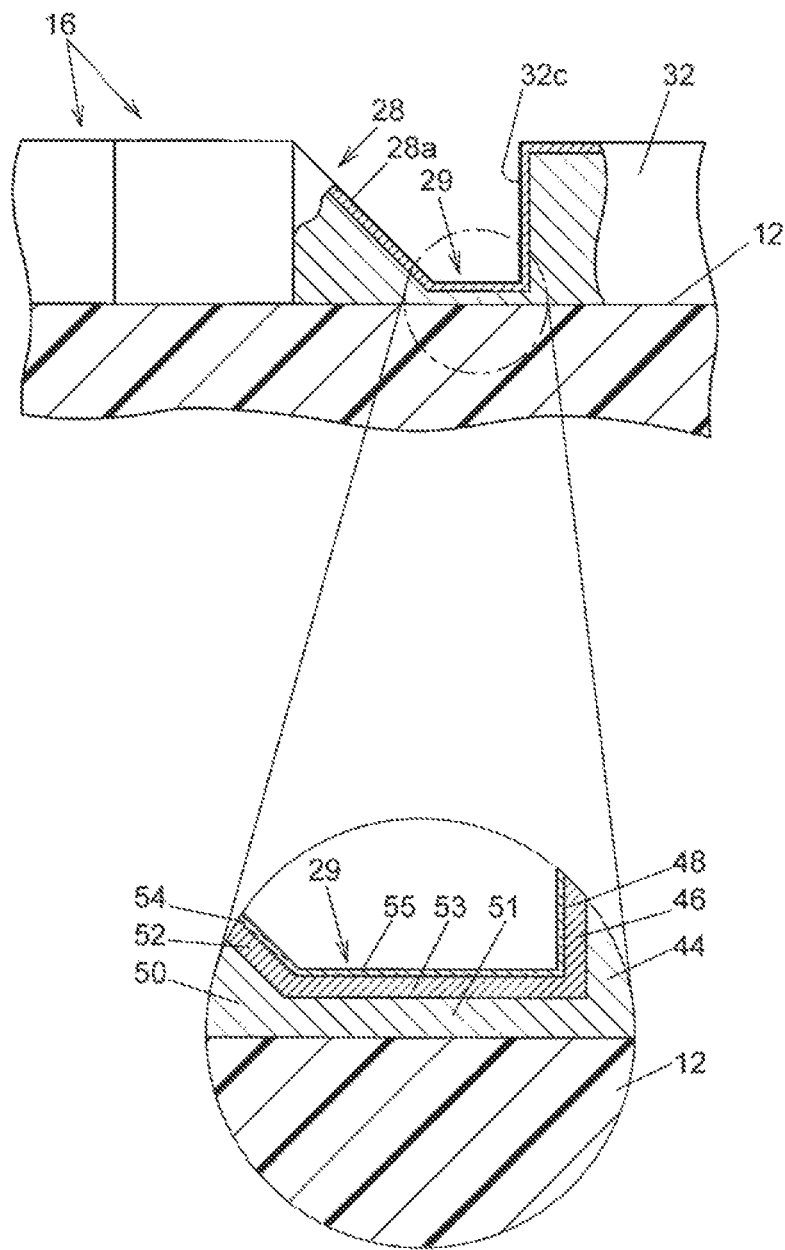
FIG. 15 is a partial enlarged cross sectional view showing a coupling portion, and the vicinity thereof, of the photoelectric conversion module in the eighth embodiment.

FIG. 15 is a partial enlarged cross sectional view showing the coupling portion 29 and the vicinity thereof. As shown in an enlarged view in a circle of FIG. 15, the coupling portion 29 is composed of a Cu layer 51 provided on the surface of the substrate 12, a Ni layer 53 provided on a surface of the Cu layer 51 and an Au layer 55 provided on a surface of the Ni layer 53. The Cu layer 51 of the coupling portion 29 is connected to and integrated with the Cu layer 50 of the mirror portion 28 and the Cu layer 44 of the protruding strip 32. The Ni layer 53 of the coupling portion 29 is connected to and integrated with the Ni layer 52 of the mirror portion 28 and the Ni layer 46 of the protruding strip 32. In addition, the Au layer 55 of the coupling portion 29 is connected to and integrated with the Au layer 54 of the mirror portion 28 and the Au layer 48 of the protruding strip 32.

The Cu layer 51 of the coupling portion 29 has the same thickness as the thinnest portion of the Cu layer 50 of the mirror portion 28. The thickness of the Ni layer 53 of the of the coupling portion 29 is not less than 9 μm and not more than 15 μm which is the same as the Ni layer 46 of the protruding strip 32, and the thickness of the Au layer 55 of the coupling portion 29 is not less than 0.05 μm and not more than 0.5 μm which is the same as the Au layer 48 of the protruding strip 32.

It is desirable that the thickness of the coupling portion 29 (the total thickness of the Cu layer 51, the Ni layer 53 and the Au layer 55) be smaller than the thickness of the clad 42 of the optical fiber 30 ((D−d)/2). By setting the thickness of the coupling portion 29 as described above, light exiting from the core 40 of the optical fiber 30 or light exiting from the photoelectric conversion element 22 and incident on the core 40 can be appropriately reflected by the mirror portion 28. That is, the coupling efficiency of the optical fiber 30 to the photoelectric conversion element 22 is enhanced.

Figure 16:
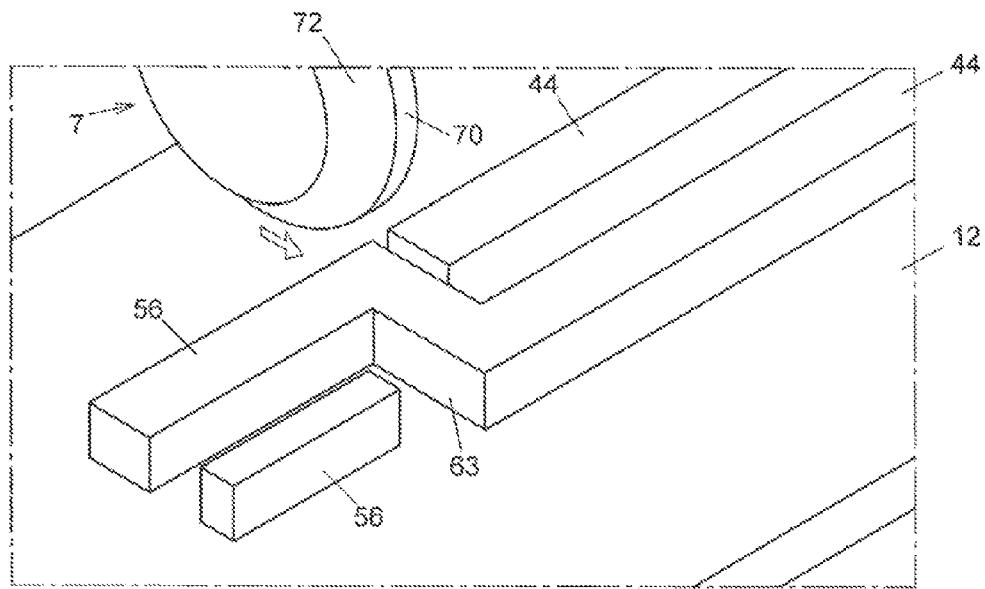
FIG. 16 is a perspective view showing a dicing step for the photoelectric conversion module in the eighth embodiment.

FIG. 16 is a perspective view showing a dicing step in the manufacturing process of the photoelectric conversion module 700. FIG. 16 shows a portion of the Cu layer etched on the substrate 12 and a blade 7. The pattern formed by the etching includes the Cu layer 44 of the restriction pattern 18, the Cu layer 56 of the electrode pattern 16 and a rod portion 63 to be shaped into the Cu layer 50 of the mirror portion 28 and the Cu layer 51 of the coupling portion 29. The rod portion 63 is integrally connected to the Cu layer 56 of the electrode pattern 16 at one end and to the Cu layer 44 of the restriction pattern 18 at another end. The rod portion 63 has a square pillar shape of which extending direction is orthogonal to the extending direction of the Cu layer 44 of the restriction pattern 18.

The blade 7 has, on an outer peripheral surface thereof, a first blade surface 70 having a cylindrical shape and a second blade surface 72 having a tapered shape formed to be inclined at an angle of, e.g., 45 degrees with respect to the first blade surface 70. A non-illustrated abrasive grain layer is provided on the first blade surface 70 and the second blade surface 72. When the blade 7 moves in a direction indicated by an arrow in FIG. 16 while rotating, the Cu layer 51 of the coupling portion 29 is shaped by the first blade surface 70 and, at the same time, the Cu layer 50 of the mirror portion 28 is shaped by the second blade surface 72. Subsequently, the Ni layers 52, 53 and 46 are plated on the surfaces of the Cu layers 50, 51 and 44, and the Au layers 54, 55 and 48 are further plated on the surfaces of the Ni layers 52, 53 and 46, thereby forming the mirror portion 28, the coupling portion 29 and the protruding strip 32.

In the photoelectric conversion module 700 of the eighth embodiment, since the rod portion 63 is connected to the Cu layer 56 of the electrode pattern 16 at one end and to the Cu layer 44 of the restriction pattern 18 at the other end, i.e., since the rod portion 63 is supported at the both ends thereof in the extending direction, separation of a portion of the rod portion 63 (the Cu layer 50 of the mirror portion 28) from the substrate 12 by receiving a pressing force of the blade 7 during a grinding process using the blade 7 can be suppressed. As a result, it is possible to reduce a defect rate and to increase a yield rate as compared to, e.g., the photoelectric conversion module 10 in the first embodiment.

Ninth Embodiment

Figure 17:
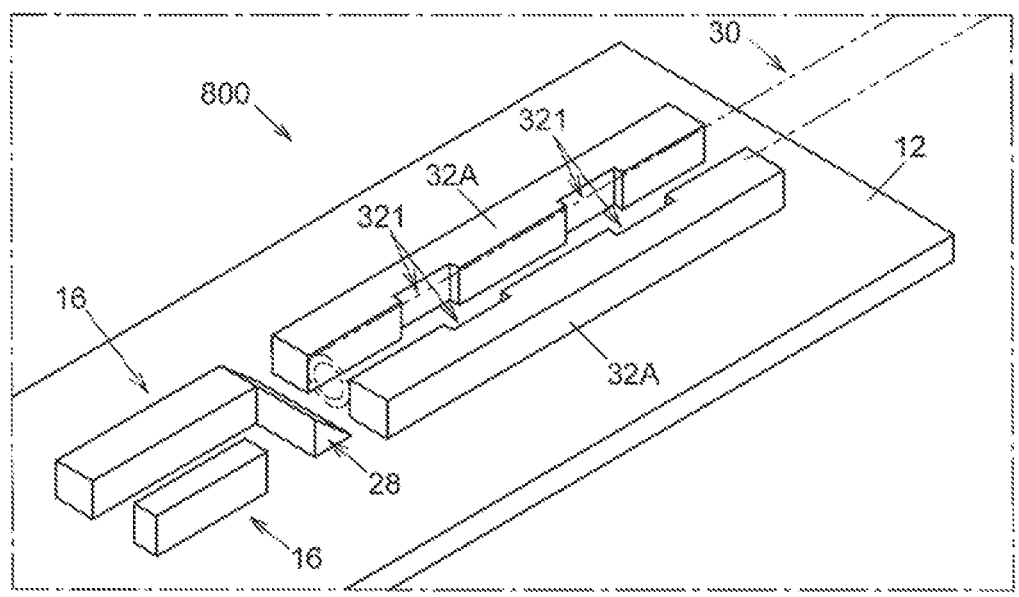
FIG. 17 is a schematic perspective view showing a photoelectric conversion module in a ninth embodiment.

A photoelectric conversion module 800 in a ninth embodiment will be described below. FIG. 17 is a schematic perspective view showing the photoelectric conversion module 800. The photoelectric conversion module 800 is different from the first embodiment in that two protruding strips 32A, 32A extending in parallel to each other while sandwiching the optical fiber 30 are provided with plural recessed portions 321 formed thereon except end portions so as to be separated from the optical fiber 30. Note that, the protruding strips 32A, 32A are formed by the same manufacturing method as for the protruding strips 32, 32 of the photoelectric conversion module 10 in the first embodiment.

In the example shown in FIG. 17, the plural (two) rectangular recessed portions 321 are formed on each of the two protruding strips 32A, 32A. The two recessed portions 321 provided on one of the two protruding strips 32A, 32A are formed at positions respectively facing the two recessed portions 321 provided on the other protruding strip 32A while sandwiching the optical fiber 30. That is, a distance between the facing surfaces of the two protruding strips 32A, 32A at the portion with the recessed portion 321 is longer than that at other portions and the optical fiber 30 does not contact with a bottom surface (a surface facing the optical fiber 30) of each recessed portion 321.

The photoelectric conversion module 800 of the ninth embodiment suppresses a phenomenon in which it becomes impossible to arrange the optical fiber 30 between the two protruding strips 32A, 32A due to a finished dimensional error of the two protruding strips 32A, 32A formed by etching and plating. In other words, in the photoelectric conversion module 10 of the first embodiment, it is not possible to arrange the optical fiber 30 if a width between the facing surfaces 32a, 32a is narrow at any one point of the entire length since the facing surfaces 32a, 32a of the two protruding strips 32, 32 could be in contact with the optical fiber 30 throughout the entire length in the extending direction of the protruding strips 32, 32, however, since the protruding strips 32A do not contact with the optical fiber 30 within a length range (a length in the extending direction of the protruding strip 32A) of the recessed portion 321 in the photoelectric conversion module 800 of the ninth embodiment, a probability in which the optical fiber 30 cannot be arranged is reduced depending on the length of the recessed portion 32.

Note that, the shape of the recessed portion 321 is not limited to a rectangular shape, and may be, e.g., an arc shape or a V-shape. In addition, the number of the recessed portions 321 formed on the protruding strip 32A is not limited to two, and may be one or three or more. Furthermore, the positions of the recessed portions 321 formed on one of the protruding strips 32A and the positions of the recessed portions 321 formed on the other protruding strip 32A may be misaligned to each other along the extending direction of the protruding strip 32A.

Tenth Embodiment

Figure 18:
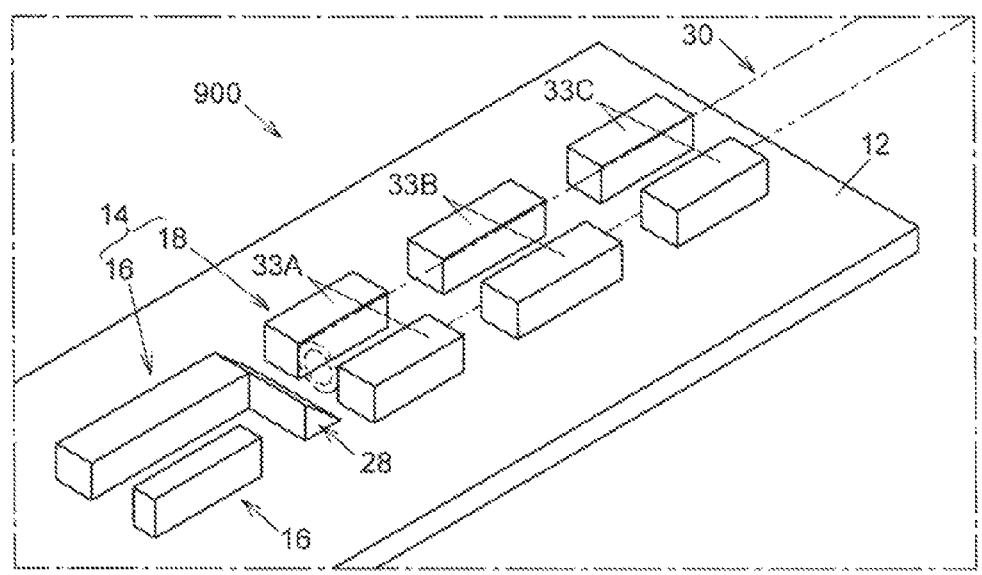
FIG. 18 is a schematic perspective view showing a photoelectric conversion module in a tenth embodiment.

A photoelectric conversion module 900 in a tenth embodiment and a modification thereof will be described below. FIG. 18 is a schematic perspective view showing the photoelectric conversion module 900. The photoelectric conversion module 900 is different from the first embodiment in a configuration of the restriction pattern 18 which is composed of plural pairs (three pairs in the example shown in FIG. 18) of protrusions 33A, 33B and 33C sandwiching the optical fiber 30.

As shown in FIG. 18, the restriction pattern 18 of the photoelectric conversion module 900 is composed of two paired protrusions 33A, 33A arranged on the mirror portion 28 side, two paired protrusions 33C, 33C arranged on the end face side of the substrate 12, and two paired protrusions 33B, 33B arranged between the two protrusions 33A, 33A and the two protrusions 33C, 33C. The optical fiber 30 is linearly arranged between the two protrusions 33A, 33A, between the two protrusions 33B, 33B and the two protrusions 33C, 33C. The protrusions 33A, 33B and 33C have a rectangular parallelepiped shape of which longitudinal direction coincides with the extending direction of the optical fiber 30, and are aligned at intervals along the extending direction of the optical fiber 30.

In the photoelectric conversion module 900 of the tenth embodiment, since the protrusions 33A, 33B and 33C are arranged at intervals, a phenomenon in which the optical fiber 30 cannot be arrange is suppressed in the same manner as the photoelectric conversion module 800 of the ninth embodiment. In addition, since the protrusions 33A, 33B and 33C are arranged at intervals, an etchant (a corrosive liquid) flows smoothly when the Cu layer of the protrusions 33A, 33B and 33C are formed by etching and it is thus possible to reduce a dimensional error of the restriction pattern 18.

Although the protrusions 33A, 33B and 33C are uniform in size in the example shown in FIG. 18, the size of the protrusions may be non-uniform. In addition, the shape of the protrusions 33A, 33B and 33C is not limited to a rectangular parallelepiped shape, and various shapes are applicable.

Figure 19:
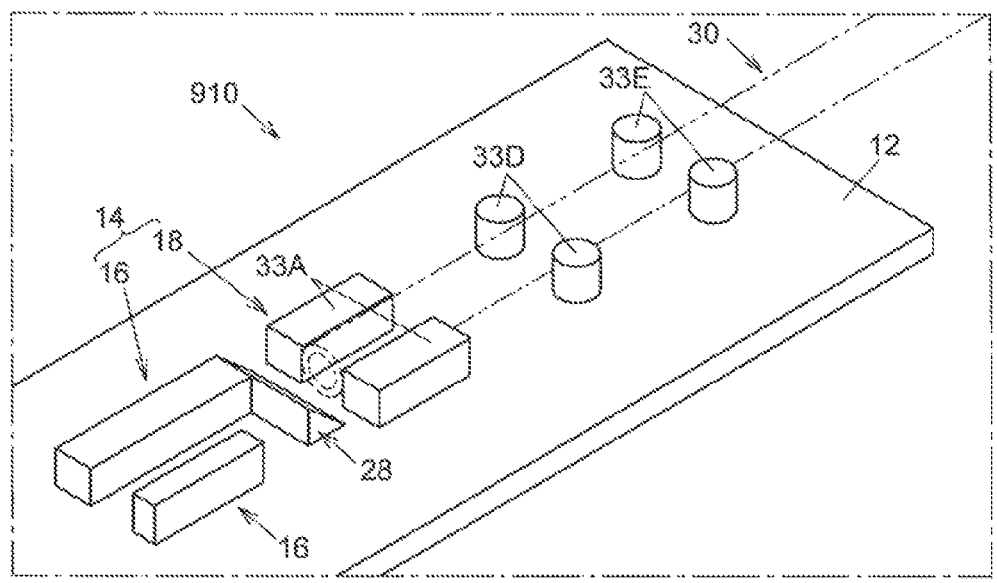
FIG. 19 is a schematic perspective view showing a photoelectric conversion module in a modification of the tenth embodiment.

FIG. 19 shows a photoelectric conversion module 910 as a modification of the photoelectric conversion module 900 of the tenth embodiment. The photoelectric conversion module 910 is provided with columnar protrusions 33D, 33D and columnar protrusions 33E, 33E instead of the protrusions 33B, 33B and the protrusions 33C, 33C of the photoelectric conversion module 900. The protrusions 33D and 33E are provided on the surface of the substrate 12 in a standing manner and the optical fiber 30 is linearly arranged between the two protrusions 33D, 33D and between the two protrusions 33E, 33E. A diameter of the protrusion 33D and that of the protrusion 33E are formed to be smaller than the length of the protrusion 33A along the extending direction of the optical fiber 30.

In the photoelectric conversion module 910, flow of the etchant is smoother than the photoelectric conversion module 900 and it is possible to reduce a dimensional error of the restriction pattern 18. As a result, it is possible to arrange the optical fiber 30 more reliably.

The invention is not limited to the first to tenth embodiments and includes modifications of the first to tenth embodiments and combinations thereof.

For example, a mirror formed of a metal block may be fixed to the surface of the substrate 12 using an adhesive, etc. In addition, two or more optical fibers 30 may be fixed to the substrate 12. In this case, the restriction patterns 18 corresponding to the number of the optical fibers 30 are formed. Then, plural photoelectric conversion elements 22 are, or an array element as a photoelectric conversion element including plural light-emitting elements or light-receiving elements is mounted on the substrate 12.

What is claimed is:
1. A photoelectric conversion module, comprising:
a substrate including a surface;
a photoelectric conversion element optically coupled to an optical fiber; and
a conductor pattern provided on the surface of the substrate, the conductor pattern including an electrode pattern mounted with the photoelectric conversion element thereon and a restriction pattern for restricting a position of the optical fiber.
2. The photoelectric conversion module according to claim 1, wherein the electrode pattern has the same thickness as the restriction pattern and comprises the same material as the restriction pattern.
3. The photoelectric conversion module according to claim 1, wherein a mirror portion comprising a reflective surface is formed on the conductor pattern to optically couple the photoelectric conversion element to the optical fiber.
4. The photoelectric conversion module according to claim 3, wherein a height of the mirror portion from the surface of the substrate is equal to the thickness of the electrode pattern and the thickness of the restriction pattern and comprises the same material as the electrode pattern and the restriction pattern.
5. The photoelectric conversion module according to claim 4, wherein the mirror portion comprises a contact surface on the substrate side of the reflective surface to restrict a position of the optical fiber in an axial direction by abutting against a tip of the optical fiber.
6. The photoelectric conversion module according to claim 3, wherein the mirror portion is formed to extend along the substrate in a direction orthogonal to the optical axis of the optical fiber such that both end portions in the extending direction are integrally connected to the electrode pattern and restriction pattern.

7. The photoelectric conversion module according to claim 1, wherein T1>(D+d)/2 is satisfied where D is a diameter of the optical fiber, d is a core diameter of the optical fiber and T1 is a thickness of the conductor pattern.

8. The photoelectric conversion module according to claim 7, wherein the photoelectric conversion element is mounted on the electrode pattern via bumps, and T1+T2>D is satisfied where T2 is a height of the bump.

9. The photoelectric conversion module according to claim 8, wherein a tip of the optical fiber is arranged between the substrate and the photoelectric conversion element and is fixed to the substrate.

10. The photoelectric conversion module according to claim 1, wherein the restriction pattern comprises two protruding strips spaced apart from each other with the optical fiber interposed therebetween.

11. The photoelectric conversion module according to claim 10, wherein a cut-out portion is formed at least one of the two protruding strips on the tip side of the optical fiber such that a distance between facing surfaces of the protruding strips is increased by the cut-out portion.

12. The photoelectric conversion module according to claim 10, wherein a recessed portion is formed on the two protruding strips except end portions so as to be separated from the optical fiber.

13. The photoelectric conversion module according to claim 1, wherein the restriction pattern comprises a plurality of pairs of protrusion sandwiching the optical fiber.

14. The photoelectric conversion module according to claim 1, wherein the optical fiber is fixed to the substrate by a hold-down member fixed to the restriction pattern via an adhesive layer.

15. The photoelectric conversion module according to claim 1, wherein the conductor pattern comprises a Cu layer, a Ni layer provided on a surface of the Cu layer and an Au layer provided on a surface of the Ni layer.

16. The photoelectric conversion module according to claim 15, wherein the Ni layer has a thickness of not less than 9 μm and not more than 15 μm.

* * * * *